(12) United States Patent
Motoyama

(10) Patent No.: US 9,990,424 B2
(45) Date of Patent: *Jun. 5, 2018

(54) SYSTEM FOR PROCESSING DATA RECEIVED FROM VARIOUS DATA SOURCES

(71) Applicant: Tetsuro Motoyama, Cupertino, CA (US)

(72) Inventor: Tetsuro Motoyama, Cupertino, CA (US)

(73) Assignee: Ricoh Company, Ltd., Tokyo (JP)

( * ) Notice: Subject to any disclaimer, the term of this patent is extended or adjusted under 35 U.S.C. 154(b) by 17 days.

This patent is subject to a terminal disclaimer.

(21) Appl. No.: 15/152,424

(22) Filed: May 11, 2016

(65) Prior Publication Data

US 2016/0253414 A1 Sep. 1, 2016

Related U.S. Application Data

(63) Continuation of application No. 13/890,812, filed on May 9, 2013, now Pat. No. 9,372,721.

(51) Int. Cl.
*G06F 17/30* (2006.01)
*G06F 9/48* (2006.01)
*G06F 3/06* (2006.01)
*G06K 9/18* (2006.01)

(52) U.S. Cl.
CPC ...... *G06F 17/30707* (2013.01); *G06F 3/0604* (2013.01); *G06F 3/0638* (2013.01); *G06F 3/0673* (2013.01); *G06F 9/4843* (2013.01); *G06F 17/3071* (2013.01); *G06F 17/30713* (2013.01); *G06K 9/18* (2013.01)

(58) Field of Classification Search
None
See application file for complete search history.

(56) References Cited

U.S. PATENT DOCUMENTS

| 7,456,988 | B2 * | 11/2008 | Stevens | G06Q 10/10 358/1.15 |
| 7,831,111 | B2 * | 11/2010 | Shah | G06F 17/30247 348/143 |
| 2007/0097420 | A1 * | 5/2007 | Shah | G06F 17/30247 358/1.15 |
| 2007/0236562 | A1 * | 10/2007 | Chang | G06F 3/14 348/61 |

(Continued)

*Primary Examiner* — Debbie Le
(74) *Attorney, Agent, or Firm* — Hickman Palermo Becker Bingham LLP; Malgorzata A. Kulczycka

(57) ABSTRACT

Techniques are provided for processing and categorizing data received from data sources. The processing and categorizing of the received data comprises: determining whether the digital data can be associated with one or more categories by determining whether a first match between one or more image characteristics of the one or more categories and one or more image characteristics of the digital data is found; in response to determining that the first match is found: associating the one or more categories with the digital data; determining, based at least in part on the one or more categories, one or more applications that are to be used to process the digital data; in response to determining the one or more applications that are to be used to process the digital data, initiating the one or more applications to process the digital data.

20 Claims, 16 Drawing Sheets

(56) References Cited

U.S. PATENT DOCUMENTS

| | | |
|---|---|---|
| 2008/0144068 A1* | 6/2008 | Digby ................ H04N 1/00132 358/1.13 |
| 2010/0332428 A1 | 12/2010 | McHenry et al. |
| 2011/0137908 A1 | 6/2011 | Dom |
| 2013/0339362 A1 | 12/2013 | Yang |
| 2014/0280335 A1 | 9/2014 | Bilange et al. |
| 2014/0337345 A1 | 11/2014 | Motoyama et al. |
| 2015/0248419 A1 | 9/2015 | Motoyama |

* cited by examiner

SYSTEM FOR PROCESSING DATA RECEIVED FROM VARIOUS DATA SOURCES

CROSS-REFERENCE TO RELATED APPLICATIONS; BENEFIT CLAIM

This application claims the benefit as a Continuation of application Ser. No. 13/890,812, filed May 9, 2013 the entire contents of which is hereby incorporated by reference as if fully set forth herein, under 35 U.S.C. § 120. The applicant(s) hereby rescind any disclaimer of claim scope in the parent application(s) or the prosecution history thereof and advise the USPTO that the claims in this application may be broader than any claim in the parent application(s).

FIELD OF THE INVENTION

Embodiments relate generally to processing data received from various data sources, and more specifically, to streamlining the process of determining the applications for processing the data received from both external and internal sources.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Technological advances in data processing have a profound impact on the way business associations conduct business. While in the past, the documents were usually docketed and processed manually, currently, the docketing and processing of the documents may be at least partially automated. For example, the invoices may be received via e-mail, the received invoices may be scanned using a scanner, and digital data generated by the scanner may be automatically transmitted from the scanner to a company processing center.

However, because the data may be received from a variety of data sources and may be represented in a variety of data formats, the received data usually needs to be processed by a specialized software application. In fact, some received data may require processing by two or more specialized applications, each of which may be selected based on many factors. For example, the specialized applications may be selected based on a data format in which the data is represented or based on a file extension of the file in which the data is saved.

Moreover, selecting the applications that are configured to process received data may depend on a source from which the data was received and a purpose for which the data was sent. For example, the data received from vendors and suppliers may be processed by invoice-processing applications, while the data sent for archiving purposes may be processed by an archiving application.

Selecting the applications to process the received data becomes even more complicated as new sources for providing data and new media for processing the data are developed and implemented. Hence, determining how to manage and process the data received from various sources is becoming more and more challenging.

SUMMARY

An apparatus is provided for processing data received from various data sources and selecting applications configured to process the received data. The apparatus comprises memory and one or more processors. The memory stores instructions which, when processed by the one or more processors, cause receiving digital data, and determining whether the digital data can be associated with one or more categories. The determination involves determining whether a first match between one or more characteristics of the one or more categories and one or more characteristics of the digital data is found. In response to determining that the first match is found, the one or more categories are associated with the digital data, and, based at least in part on the one or more categories, one or more applications that are to be used to process the digital data are determined. In response to determining the one or more applications that are to be used to process the digital data, the one or more applications are initiated for processing the digital data.

BRIEF DESCRIPTION OF THE DRAWINGS

In the figures of the accompanying drawings like reference numerals refer to similar elements.

DETAILED DESCRIPTION

Figure 1A:
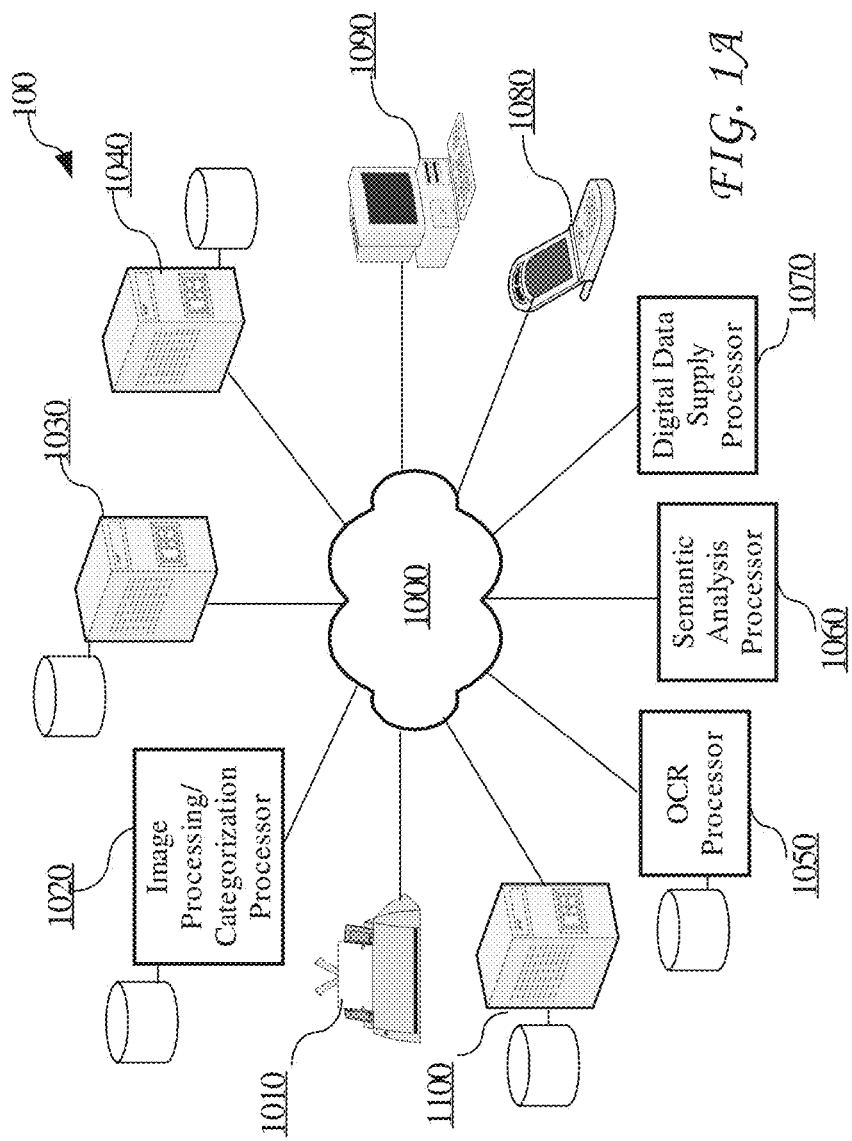
FIG. 1A is a block diagram that depicts an example of processing environment for processing data received from various data sources.

In the following description, for the purposes of explanation, numerous specific details are set forth in order to provide a thorough understanding of the embodiments. It will be apparent, however, to one skilled in the art that the embodiments may be practiced without these specific details. In other instances, well-known structures and devices are shown in block diagram form in order to avoid unnecessarily obscuring the embodiments.

I. OVERVIEW
II. SYSTEM ARCHITECTURE
III. DATA FORMATS
IV. IMAGE PROCESSING/CATEGORIZATION PROCESSOR
V. PROCESSING DATA RECEIVED FROM VARIOUS DATA SOURCES
   A. Introduction
   B. Image Processing and Categorization
   C. Process Modifications
   D. Example of Processing Invoice Data Received from a Data Source
   E. Category Editor
   F. Training Process
VI. IMPLEMENTATION MECHANISMS I. Overview An approach is provided for processing data received from various data sources. According to the approach, a processing/categorization processor receives digital data. Upon receiving the digital data, the processing/categorization processor determines whether the digital data can be associated with one or more categories. The determination is made by determining whether a first match between one or more characteristics of the one or more categories and one or more characteristics of the digital data is found.

In response to determining that the first match is found, the one or more categories are associated with the digital data. Based at least in part on the one or more categories, one or more applications that are to be used to process the digital data are determined.

In response to determining the one or more applications configured to process the digital data, the one or more applications are initiated for processing the digital data.

Generally, there are three different types of methods for identifying categories for digital data. These method types include an image based type, a text based type, and a semantic based type. Image based methods use preprocessed images as input. A preprocessed image may be obtained by performing for example, an image "skew" correction and an image noise reduction. According to an image based method, image characteristics are extracted from the preprocessed image, and a match is sought between the extracted image characteristics and characteristics of known categories. The matched categories are associated with the image. The matched categories may be associated with the image according to confidence levels. For example, if for a particular image, the most important image characteristics identified for the image match all but one characteristic of a particular category, then the particular category may be associated with the particular image with a confidence level of 99%. The confidence levels may also be assigned using weights of the categories. The image based methods are usually inapplicable to input digital data expressed in data formats other than an image format.

Text based methods use text data as input. If input data is text data or image data converted to the text data through for example, an optical character recognition (OCR), then text characteristics of the text data are used to identify categories for the text data. For example, an input text data stream may be parsed, words in the stream may be recognized, and categories for the text data may be found using characteristics associated with the words.

If the words are recognized using an OCR approach, then categorization may be performed in parallel. For example, as the sequences of words are generated and stored in a standard text format for further processing, a keyword matching may be performed on the words to identify the categories for the words. The identified categories may be stored in a data structure along with the corresponding confidence levels, which may be determined as it was described for the image based methods. The confidence levels determined for text data are likely to be higher than confidence levels determined for image data.

Semantic based methods use semantic characteristics identified for text data. For example, after a text based processing of text data is completed, the text data may be subjected to a semantic analysis for a further refinement. A semantic analysis process can be performed in parallel to a category identification process. For example, determining semantic characteristics of the text data may be performed in parallel to identifying the categories for the identified semantic characteristics of the data. The identified categories may be stored in a data structure along with the corresponding confidence levels.

A category mismatch (or mismatch) may occur when, in the process of determining categories for input data, different methods returned different categories. If there is a mismatch, then decision-making processes and decision-making logs may be analyzed and the mismatch may be corrected. A mismatch may be corrected by for example, determining and accepting the category that was identified with the highest confidence level. For instance, after identifying a category for which the confidence level is higher than the confidence levels associated with other categories identified for input data, that category may be used to identify decision points at which incorrect decisions were made, and the incorrectly identified categories may be disassociated from the input data.

After one or more categories are identified for input data, one or more applications associated with the categories are identified. Non-limiting examples of the applications include an e-mail archiver, a purchase order system, a payment system, and a payroll system. Once the applications are identified, the applications are initiated, the input data is ported to the initiated application, and processing of the input data by the applications is enabled.

II. System Architecture

FIG. 1A is a block diagram that depicts an example of processing environment 100 for processing data received from various data sources. In an embodiment, processing environment 100 comprises a multifunction peripheral device (MFP)/scanner 1010, an image processing/categorization (IPC) processor 1020, application servers 1030 and 1100, a digital data server 1040, an OCR processor 1050, a semantic analysis processor 1060, a digital data supply processor 1070, a mobile device 1080, and a workstation 1090. Devices 1010-1100 are merely examples of the devices that may be part of processing environment 100. Devices not depicted in FIG. 1A may include digital cameras, data sensors, video signal generating and emitting devices, and others. The device may communicate with each other via a cloud system 1000.

In an embodiment, MFP 1010 may be configured to print electronic documents, scan printed documents, generate digital data for the scanned documents, and otherwise process jobs sent to MFP 1010. The jobs may be sent to MFP 1010 directly from other devices, or indirectly via cloud system 1000. MFP 1010 may send digital data directly to other devices or store the digital data on cloud system 1000.

Figure 5:
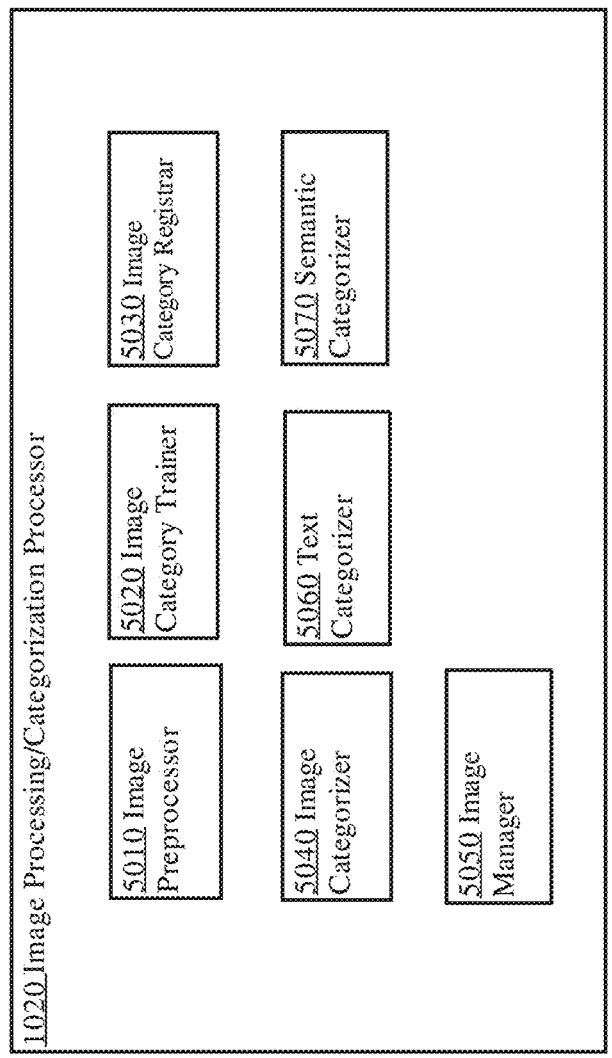
FIG. 5 is a block diagram that depicts an example of an image processing/categorization processor.

In an embodiment, IPC processor 1020 may be configured to process received digital data and determine whether the received digital data may be categorized into one or more categories. IPC processor 1020 may receive digital data directly from other devices, or may retrieve digital data from cloud system 1000. IPC processor 1020 may associate categories to the received digital data, and store the respective associations either in a local storage device or on cloud system 1000. An example of IPC processor 1020 is depicted in FIG. 5.

Application servers 1030, 1100 may be configured to host and provide execution environment for software applications configured to process information and to store the processed information in a local storage device or on cloud system 1000. For example, application server 1030 may be configured to host a software application designed to process electronic invoices, update an invoice database stored on cloud system 1000, and generate invoice reports based on the data stored in the invoice database. According to another example, application server 1100 may be configured to process electronic filing receipts received from the United States Patent and Trademark Office (USPTO) website upon submitting an electronic document to the USPTO. Application server 1110 may docket the received electronic filing receipt, and update a docketing database stored on cloud system 1000.

Digital data server 1040 may be configured to receive electronic data from other devices, send the electronic data to other devices, and store the electronic data in a storage device or on cloud system 1000. For example, digital data server 1040 may communicate with other servers, and receive from other servers electronic update data, such as stock market data, invoice data, or other electronic data. Digital data server 1040 may also store the received data on cloud system 1000 or send the received data to other devices.

Workstation 1090 may be configured to provide an execution environment to software applications configured to process received digital data. For example, workstation 1090 may be configured to support execution of an email application, which may handle receiving emails, generating emails, sending emails and otherwise processing emails. According to another example, workstation 1090 may be configured to support execution of an invoice generating application, which may facilitate generating electronic invoice data, sending the invoice data to other devices, receiving electronic invoice data, updating an invoice database, and storing electronic invoice data in a local storage device or on cloud system 1000. Workstation 1090 may be used to execute an image category trainer 5020, depicted in FIG. 5.

Mobile device 1080 may be configured to receive, process and transmit electronic data. For example, mobile device 1080 may be configured to receive and place telephone calls, access the Internet, generate and receive electronic data, take pictures of physical objects, display digital image data, record and play video data, and otherwise process electronic data.

Digital data supply processor 1070 may be configured to supply digital data to processing environment 100. Digital data supply processor 1070 may also be configured to generate additional data for the received digital data. For example, digital data supply processor 1070 may extract the digital data from a database and port the extracted data to an application. In case of an invoice processing, upon receiving an invoice, digital data supply processor 1070 may access a purchase order database to obtain a purchase order related to the invoice, and associate the obtained purchase order with the invoice.

OCR processor 1050 may be configured to perform optical character recognition of digital data. For example, OCR processor 1050 may use image data as input, and use the image data to generate a sequence of words or phrases as output.

Devices included in processing environment 100 may communicate with each other via any number and type of communications links. Examples of communications links include, without limitation, direct links, local area networks, wide area networks, wired networks, wireless networks, packet-switched networks such as the Internet, etc. As depicted in FIG. 1A, devices of processing environment 100 communicate with each other via a network, such as a cloud system 1000. For example, an application executed on workstation 1090 may be configured to create a print job for printing a document on MFP 1010 and store the print job in cloud system 1000, so that MFP 1010 may retrieve the print job from cloud system 1000 and print the document. According to another example, MFP 1010 may scan a document, generate electronic data for the document, and store the electronic data in cloud system 1000, so that OCR processor 1050 may retrieve the electronic data for the document from cloud system 1000, perform OCR of the electronic data, create electronic data in a standard text format, and store the electronic data in the standard text format in cloud system 1000.

Some devices included in processing environment 100 may communicate with each other directly. For example, an application executed on workstation 1090 may create a print job for printing a document on MFP 1010, and, although it is not depicted in FIG. 1A, send the print job directly to MFP 1010, bypassing cloud system 1000. According to another example, MFP 1010 may scan a document, generate electronic data for the document, and send the electronic data to OCR processor 1050, so that OCR processor 1050 may perform OCR of the electronic data, create a document for the electronic data, and store the document in a storage associated with OCR processor 1050.

III. Data Formats

Devices included in processing environment 100 may be configured to receive various types of information. The information may be represented in a variety of formats and forms, such as hard copies, electronic data, or alike. A non-limiting example of information represented as a hard copy includes a document printed on a paper medium. Non-limiting examples of such documents include printouts of invoices, printouts of purchase orders, printed reservation confirmations, photographs, photocopies of billing statements, and drawing.

In an embodiment, input data represented as a hard copy is scanned to a scanner and the scanner generates an electronic version of the input data. For example, a document on a paper medium may be fed into MFP 1010, and MFP 1010 may scan the paper document, generate digital image data for the paper document, and store the digital image data in a cloud system 1000 or a storage device.

Conversely, digital image data may be processed to produce a hard copy of the digital image data. For example, a software application executed on workstation 1090 may send digital image data to MFP 1010 and cause MFP 1010 to generate and print out a hard copy of the digital image data.

Generally, digital data may include any of image data, text data, video data, or voice data. Digital data may be represented in a variety of formats. Non-limiting examples of digital image data formats include a PDF, JPEG, GIF, TIFF and alike. For example, digital image data may be the data obtained using a digital camera and stored in a JPEG format.

Non-limiting examples of text data formats include a PDF, MS Word, and alike.

Non-limiting examples of video data formats include MP4, MJ2, and alike.

Non-limiting examples of voice data format include an AIFF, WAV, MP3, and alike.

In an embodiment, data formats that are preferred formats in a particular implementation are referred to as standard formats. The standard formats may include a standard image format, a standard text format and a standard semantic format. A standard image format is an image format that is used by the system for storing, processing and displaying image data. In a particular system, a standard image format may be a TIFF format or a PDF format. Digital data represented in a standard image format is referred to as standard image format data.

A standard text format is a format used by the system to support a word analysis of digital data, and a standard sematic format is a formats used by the system to support a semantic analysis of the digital data. Non-limiting examples of such formats include a CVS, XML, Jason, or other known formats used for expressing text format data and semantic format data. Digital data represented in a standard text format is referred to as standard text format data. Digital data represented in a standard semantic format is referred to as standard semantic format data.

In an embodiment, digital data received from a data source is preprocessed to determine one or more applications that are to be used to further process the digital data. The preprocessing of the digital data may involve examining a format of the digital data, examining a file extension, such as ".doc," ".JPEG," ".TIFF," ".pdf," or ".docx," and determining characteristics of the digital data that may be used to identify one or more categories, and then one or more software applications configured to further process the digital data.

However, in some situations, preprocessing of the digital data may fail to provide sufficient indication of the applications configured to further process the digital data, or the provided indication may be derived with an insufficient level of confidence. In such situations, additional processing of the digital data may be performed.

In an embodiment, additional processing of digital data may include determining word characteristics data or semantics characteristics data for the digital data. For example, the digital data, represented in a PDF format, may be converted to standard text format data, and may be processed by an OCR processor 1050. For instance, OCR processor 1050 may convert the image data into coded data such as Unicode data, and parse the coded data to produce a standard text format data. If during the parsing process a word or a phrase is identified in the standard text format data, then the word or the phrase may be sent to IPC processor 1020, and IPC processor 1020 may use the identified word or phrase to determine one or more categories associated with the word or the phrase.

The standard text format data may also be processed by a semantic analysis processor 1060 to determine semantic characteristics of the standard text format data and generate a standard semantic format data. For example, semantic analysis processor 1060 may use the standard text format data to generate standard semantic format data, determine one or more semantic characteristics of the standard semantic format data, and send the semantic characteristics to IPC processor 1020. IPC processor 1020 may use the semantic characteristics to determine one or more categories associated with the standard semantic format data. Based on the determined categories, one or more applications configured to further process the digital data may be identified.

IV. Image Processing/Categorization Processor

FIG. 5 is a block diagram that depicts an example of an IPC processor 1020. In the depicted example, IPC processor 1020 comprises an image preprocessor 5010, an image category trainer 5020, an image category registrar 5030, an image categorizer 5040, a text categorizer 5060, a semantic categorizer 5070, and an image manager 5050. In other implementations, IPC processor 1020 may comprise some of the components 5010-5070, or additional components not depicted in FIG. 5.

Image preprocessor 5010 may be configured to preprocess digital data received from various data sources. Some of the preprocessing may involve reducing noise in the received data, enhancing edges and correcting image skew in the data. Image preprocessor 5010 may store the received data and the preprocessed data in a storage device or in a cloud system 1000.

Image preprocessor 5010 may also be configured to extract image characteristics from received digital data. Furthermore, image preprocessor 5010 may invoke other processors and devices, such as an OCR processor 1050, to convert the received digital data to standard text format data, and if needed, to generate standard semantic format data.

Image category trainer 5020 may be configured to create a set of categories from training data. The training data may emulate the data to be received from various data sources in the future. Image category trainer 5020 may implement a category editor, described in detail in FIG. 6, below.

Image category registrar 5030 may be configured to register a set of categories determined by image category trainer 5020. A registration process may involve determining characteristics of the data for which the categories may be identified, and storing the characteristics, the categories and other information related to the characteristics and the categories.

Image categorizer 5040 may be configured to determine one or more categories for digital data based on image characteristics of the digital data. For example, upon receiving a filing receipt from a particular server, image categorizer 5040 may determine one or more categories for the received filing receipt. The one or more categories may be found using for example, the approach described in FIG. 2, below. If a particular category is found, then image categorizer 5040 may associate the particular category with the received filing receipt. Various methods for assigning categories to received data are described in FIG. 2, below.

Text categorizer 5060 may be configured to determine a category or categories for digital data based upon word characteristics of the digital data. For example, text categorizer 5060 may receive a standard text format data comprising a sequence of character strings (such as words or phrases), and process the received sequence to identify the word characteristics of the strings.

Semantic categorizer 5070 may be configured to determine a category or categories for digital data based upon semantic characteristics of the digital data. For example, semantic categorizer 5070 may receive a standard semantic format data, and process the standard semantic format data to identify the semantic characteristics of the standard semantic format data.

Image manager 5050 may be configured to coordinate information exchange between various objects and components of IPC processor 1020. For example, image manager 5050 may be responsible for retrieving data from various storage locations, transmitting the retrieved data to various components and servers, and storing the received data and preprocessed data in storage devices and cloud systems.

V. Processing Data Received from Various Data Sources

A. Introduction

Processing data received from various data sources and interfacing the processed data with the applications configured to further process the received data is usually quite challenging. Because the received data may be received from a variety of heterogeneous devices and represented in any of many data formats, determining the applications configured to process the data may be difficult.

Figure 4:
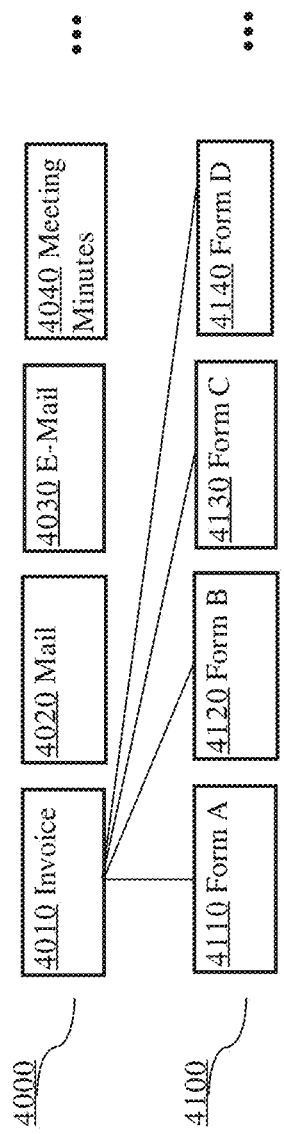
FIG. 4 depicts examples of various types of data received from various data sources.

FIG. 4 depicts examples of various types of data that a data processing system may receive. The example depicts a two-level classification of received data; however, other implementations may have fewer or more classification levels. A first level 4000 comprises a set of various types of received data, including an invoice 4010, mail 4020, electronic mail (e-mail) 4030, and meeting minutes 4040. A second level 4100 comprises a set of various subtypes identified for the types listed in the first level 4000. For example, the invoice 4010 may have several subtypes, including a form A 4110, form B 4120, form C 4130 and form D 4140. In other implementations, other types and subtypes may be identified for the data received from data sources.

Figure 1B:
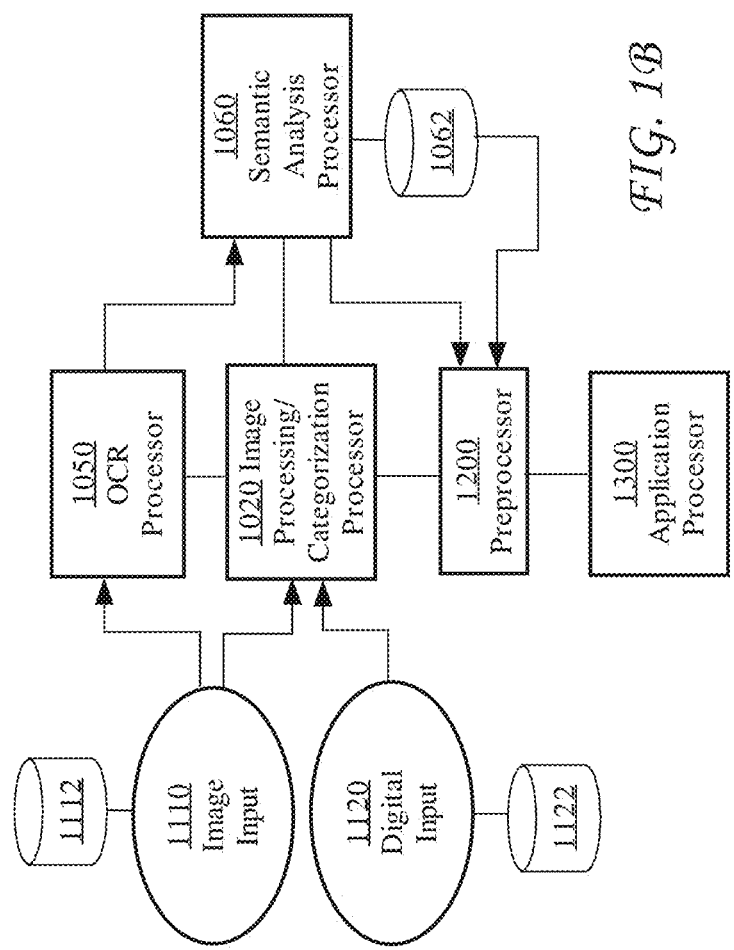
FIG. 1B is a block diagram that depicts an example of processing data received from various data sources.
Figure 1C:
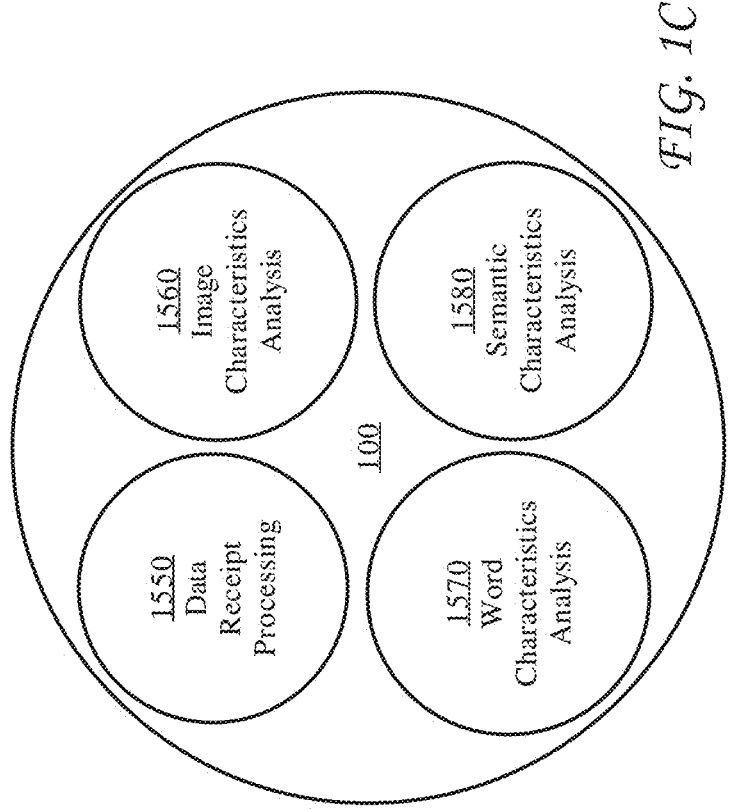
FIG. 1C is a block diagram that depicts various types of processing of data received from various data sources.

FIG. 1C is a block diagram that depicts various types of processing that may be performed on data received from data sources. FIG. 1C depicts the following types of processing: a data receipt processing 1550, an image characteristics analysis 1560, a word (text) characteristics analysis 1570, and a semantic characteristics analysis 1580. Depending on the implementation, some processing environments may be configured to perform all four types of processing 1550-1580, while other processing environments may be configured to perform some of 1550-1580, but not all. Some other processing environments may be configured to perform additional types of processing not depicted in FIG. 1C.

Data receipt processing 1550 comprises various types of processing, including receiving data from data sources, storing the received data, and notifying an IPC processor that the data was received. Data receipt processing 1550 may comprise testing a status of data input ports of data input devices, and upon detecting that data has been received on a particular data input port, receiving the data, determining a storage location for the data, sending the received data to the storage location and indicating to the IPC processor that the data has been received and stored. Upon receiving a message that data has been received, an IPC processor may initiate data conversion to one or more standard format data, and initiate an image characteristics analysis 1560, a word characteristics analysis 1570, and a semantic characteristics analysis 1580 of the data.

Image characteristics analysis 1560 comprises any type of processing leading to determining image characteristics of digital data. For example, performing image characteristics analysis 1560 of digital image data may allow determining a file type for the digital image data, and use the determined file type to identify one or more image characteristics of the digital data. The image characteristics may be transmitted to an IPC processor, which may use the image characteristics to determine one or more categories for the digital data.

A category indicates a type of the received image data. Example categories include, without limitation, an invoice, mail, email, meeting minutes, purchase receipt, filing receipt, marketing materials, an applications, disposition, request, confirmation, report, statistical data, and others.

A repertoire of the categories may vary from one company to another, and may depend on for example, the charter of the company. For example, a company that specializes in distributing printing devices may define a set of categories differently than a company that is a holding company. Also, a company that receives purchase invoices from a large group of vendors may define a set of categories differently than a company that receives purchase invoices from one or two vendors.

In some situations, a category may have subcategories. For example, if a company receives purchase invoices from different vendors and the invoices from each vendor have different formats, then the company may determine that a main category is called an "invoice," and that the main category has several subcategories, each for a different invoice format or form.

A category may be represented using a data object structure. A data object for a category may be represented as a data table, and may be stored in memory. The category data object may be referenced by a name of the data table or a pointer to some space allocated in the memory. An example of category data object is described in detail in FIG. 8, below.

Figure 8:
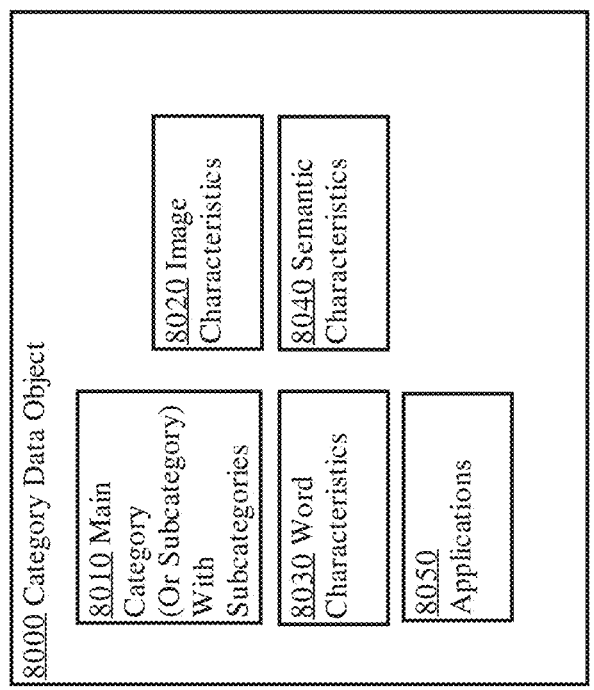
FIG. 8 is a block diagram that depicts an example category data object.

FIG. 8 is a block diagram that depicts an example of a category data object 8000. A category data object 8000 may be created for a main category or a subcategory. A main category (or a subcategory) may comprise subcategories, image characteristics 8020, word characteristics 8030, semantic characteristics 8040 and applications 8050. In FIG. 8, the main category with its subcategories (or the subcategory with its subcategories) is depicted as element 8010.

A main category (or a subcategory) with its subcategories 8010 may include parameter information about the name of the main category (or the name of the subcategory) and the references to the associated subcategories. The references are stored in a linked list. If there is no associated subcategory, then the linked list has a zero-length.

Image characteristics 8020 may include any type of parameter information that is specific to digital data, and that may be identified from inspecting the digital data.

Word characteristics 8030 may include words and phrases indicative of digital data of the particular category. Word characteristics may be determined by performing an optical character recognition of training data of the particular category or analyzing the various standard text format data from various sources.

Semantic characteristics 8040 may include meanings of digital data of the particular category. Semantic characteristics may be determined by performing a semantic analysis of training data of the particular category or analysis of large volume of data from various sources.

Semantic analysis is a method for eliciting and representing meaning of digital data. By performing a semantic analysis, standard text format data is converted to standard semantic format data, and additional information for the identified words is generated. For example, if the digital data comprises two sentences "The house caught up on fire" and "The employee was fired," then both sentences contain the same word "fire," yet the meaning of the word "fire" is different. Based on the semantic analysis of the sentences, the meaning of the word "fire" for each of the sentences may be determined, and the first sentence may be associated for example, with a "damage" category, while the second sentence may be associated with for example, a "human resource" category.

Performing a semantic analysis of digital data may be outsourced and performed by specialized software applications through various libraries or cloud interfaces. References to applications 8050 may include a linked list of links and pointers to a memory space, disk space or storage device used to store one or more applications to be used to further process the received digital data. For example, if a main category 8010 is an "invoice," then the application references 8050 may reference one or more applications that are to be used to process the invoices.

Referring again to FIG. 1C, word analysis 1570 comprises any type of processing leading to determining word characteristics of digital data. In particular, word analysis 1570 may start from identifying meaningful words in the received digital data. For example, word analysis 1570 of digital image data may perform an optical character recognition of the image, produce word data, and identify word characteristics of the word data. The optical character recognition of the digital data may be performed by an OCR processor 1050 depicted in FIG. 1A.

If the word analysis 1570 returned one or more word characteristics of the digital data, then the word characteristics may be transmitted to an IPC processor. The IPC processor may use the word characteristics to determine one or more categories for the data. If the one or more categories have been already determined based on for example, image characteristics of the data, then the IPC processor may use the word characteristics to refine the selection of the categories, determine additional categories, or determine subcategories for the selected categories.

Semantic analysis 1580 comprises any type of processing leading to determining a meaning of the digital data. The semantic analysis 1580 may be performed independently of or in conjunction with word analysis 1570 and image characteristic analysis 1560. The semantic analysis 1580 may include processing of standard text format data, generating standard semantic format data, and determining one or more semantic characteristics of the standard semantic format data.

One of the objectives of a semantic analysis 1580 is to determine one or more semantic characteristics of the received data. The semantic characteristics may comprise words or phrases indicative of the meaning of the data. For instance, the semantic analysis 1580 may determine that the data pertains to a message from a manager to a human resource representative and contains performance review of a subordinate employee.

If the semantic analysis 1580 is successful and provided one or more semantic characteristics of the received data, then an IPC processor may use the semantic characteristics to determine one or more categories for the data. If the one or more categories have been already determined for the received data, then the IPC processor may use the semantic to refine the selection of the categories, to determine additional categories for the received data, or to determine subcategories for the selected categories. Continuing with the above example, if during a word characteristics analysis, a main category called "Human Resources" has been identified and associated with the received message as a main category, a subcategory of the "Human Resources" and called a "Performance Issue" may be identified.

Once at least one category has been identified for the received data, an IPC processor may use the information about the category to determine one or more applications that are configured to further process the received data.

The various types of processing depicted in FIG. 1C are merely examples of the processing leading to determining one or more applications to be used to handle the received data. Additional types of processing may also be involved. For example, processing based on the probability theory or fuzzy logic theory may also be implemented to assist the decision making process.

Further, no specific order is required for performing the various types of analyses depicted in FIG. 1C. In some implementations, the processing 1550-1580 may be performed sequentially. In other implementations, some processes may be performed in parallel. In yet other implementations, only some of the processing 1550-1580 is performed.

B. Image Processing and Categorization

FIG. 1B is a block diagram that depicts an example of processing data received from various data sources. In FIG. 1B, the data may be received at image input 1110, digital input 1120, or both. For example, digital data, such as a JPEG image of an invoice, may be retrieved from a storage device 1112, and received at image input 1110. According to another example, digital data, such as a PDF file, may be retrieved from a storage device 1122 and received at digital input 1120.

Received digital image data may be converted to standard image format data and sent to IP processor 1020. IPC processor 1020 may use the standard image format data to determine one or more categories for the data. IPC processor 1020 may determine a category for the data based on image parameter values extracted from the data. If the extracted parameter value matches ninety nine parameter values out of a hundred parameter values of an "invoice" category, then the data may be classified as an "invoice" with a 99% confidence level. The confidence level may also be computed using weights associated with the parameter values.

Upon associating a category with received image data, IPC processor 1020 may determine one or more software applications that are configured to process the received digital data. For example, using information stored in association with the "invoice" category, IPC processor 1020 may retrieve references to one or more applications that are configured to process invoices.

Upon associating one or more categories and one or more references of applications with digital data, IPC processor 1020 may send the standard image format data and the associated information to a preprocessor 1200.

Preprocessor 1200 is configured to determine whether any preprocessing of the data is needed before the data may be ported to applications. If any preprocessing is needed, then preprocessor 1200 performs the preprocessing. For example, preprocessor 1200 may perform data translation, data format conversion, and other types of data preprocessing.

The preprocessed information may be sent to an application processor 1300, which provides an execution environment for processing the digital data. For example, if received digital data is an invoice document, and IPC processor 1020 identified a particular application that is to be used to process the invoice, then application processor 1300 initiates execution of the particular application and the processing of the invoice.

However, in some situations, upon receiving digital image data, IPC processor 1020 may be unable to determine any application configured to further process the received digital data, or IPC processor 1020 may unable to determine such an application with a certain level of confidence. That may occur when IPC processor 1020 is unable to collect a sufficient amount of information such as parameter values from the received digital image data, or the collected information does not indicate any of known categories with the certain level of confidence. In such situations, IPC processor 1020 may instruct an OCR processor 1050 to perform an optical character recognition of the digital data, and provide standard text format data with word characteristics to IPC processor 1020.

Furthermore, IPC processor 1020 may instruct a semantic analysis processor 1060 to perform a semantics analysis of the image data, and provide semantic characteristics to IPC processor 1020.

Once word characteristics or semantic characteristics (or both) are provided to IPC processor 1020, IPC processor 1020 may again attempt to determine one or more categories for the digital data. For example, IPC processor 1020 may try to find a match between the provided word characteristics of the digital data and one or more word characteristics associated with known categories, and upon finding a match, identify the category (or categories) for which the match was found. Similarly, if semantic characteristics of the digital data are provided, then IPC processor 1020 may try to find a match between the provided semantic characteristics of the digital data and one or more semantic characteristics associated with the categories, and upon finding a match, identify the category (or categories) for which the match was found.

Figure 2A:
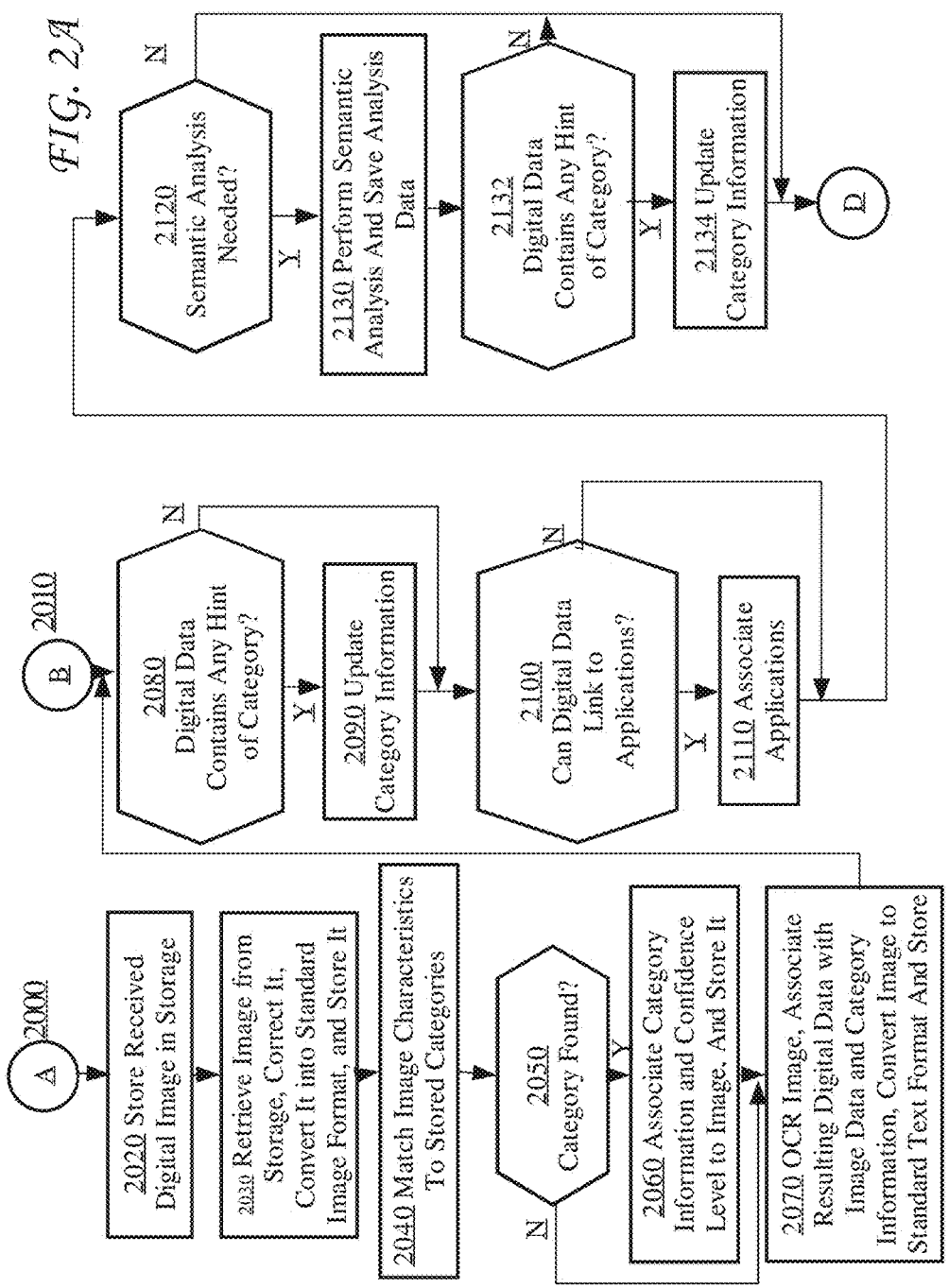
FIG. 2A is a flow diagram that depicts an example of processing data received from various data sources.
Figure 2B:
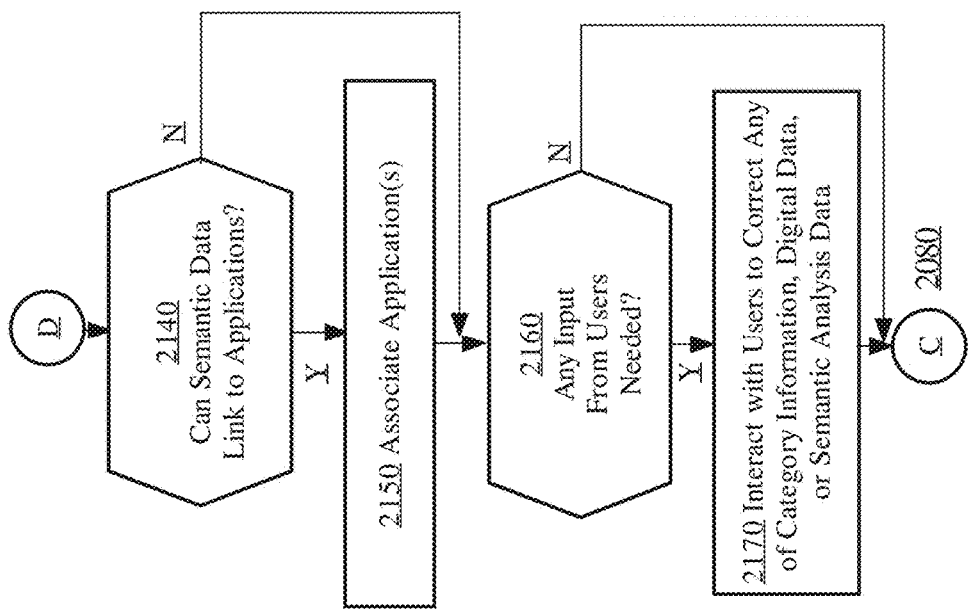
FIG. 2B is a flow diagram that depicts an example of processing data received from various data sources.
Figure 9:
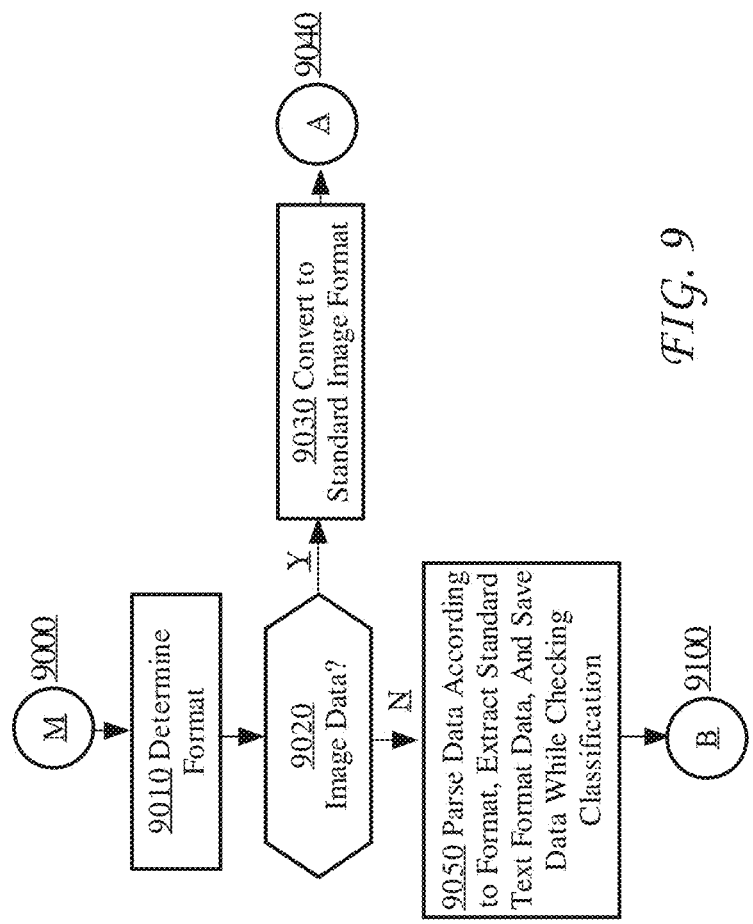
FIG. 9 is a flow diagram that depicts an example of digital data processing.

FIG. 9 is a flow diagram that depicts an example of digital data processing before the steps depicted in FIG. 2A-2B are executed. In step 9010, a format of received digital data is determined. The format of the digital data may be determined based on for example, the information included in a header or in a suffix of the received digital data. For example, the received data may have a file extension (suffix) as ".txt" or ".JPG."

In step 9020, it is determined whether the received digital data represents or comprises an image. If so, then in step 9030, the received digital data is converted to standard image format data, and the resulting standard image format data is provided to an entry A, depicted in FIG. 2A.

However, if the received digital data does not represent image data, then in step 9050, the received digital data is parsed, standard text format data is generated, and the resulting standard text format data, along with possible category identification, is provided to an entry B, depicted in FIG. 2A.

FIG. 2A-2B are flow diagrams that depict an example of processing data received from various data sources. There are two data inputs A 2000 and B 2010. The two inputs were described in FIG. 9, in which the two inputs are referenced as inputs A 9040 and B 9100, respectfully.

Referring first to FIG. 2A, in step 2020, data is received from a data source and stored as original data in a storage device. The data may be received as a hard copy of a document. In such a situation, the received hard copy may be scanned using a scanning device, and the scanning device may generate digital data of the document. The digital data may be stored in a storage device or in a cloud system.

Alternatively, data received from a data source may be already digital data. For example, the digital data may be an electronic mail sent from an email server.

In an embodiment, upon receiving digital data, a data structure may be created for the digital data in a storage device or in a cloud system. The data structure may be used to store the digital data and the information collected about the digital data or generated for the digital data. The data structure may comprise links to various characteristics of the digital data.

In an embodiment, the data structure is an information object created by an object-oriented software application. An example of the information data object is depicted in FIG. 3.

Figure 3:
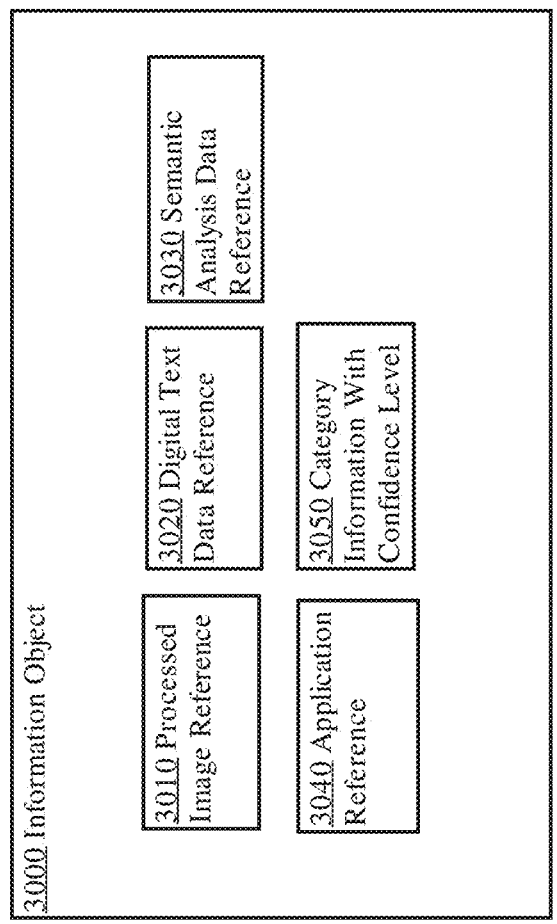
FIG. 3 is a block diagram that depicts an example information object.

FIG. 3 is an example information object 3000. The example depicted in FIG. 3 is merely one of many examples of data structures used to store information about digital data received from various sources.

An information object 3000 may be generated as an object-oriented data object, and may be used to store links or references to information related to digital data. In the example depicted in FIG. 3, an instantiated information object comprises a processed image reference 3010, a digital text data reference 3020, a semantic analysis data reference 3030, an application reference 3040, and category information with a confidence level 3050.

A processed image reference 3010 may be a link or a pointer to a memory space, disk space or a storage device used for storing processed image data represented in a standard image format and obtained in step 2030 of FIG. 2A. It may also be a link or a pointer to a disk space or to a storage device used for storing the digital data.

A digital text data reference 3020 may be a link or a pointer to a memory space, disk space or a storage device used for storing OCR results represented in a standard text format and obtained in the step 2070 of FIG. 2A.

A semantic analysis data reference 3030 may be a link or a pointer to a memory space, disk space or a storage device used for storing standard semantic format data generated by a semantic analysis processor.

An application reference 3040 may be a link or a pointer to a memory space, disk space or a storage device used for storing references to the applications configured for processing the received data.

A category information with a confidence level 3050 may be a link or a pointer to a memory space, disk space or a storage device used for storing category information identified for the received data and confidence levels with which the categories were identified for the received data.

Referring again to FIG. 2A, in step 2030, if needed, received digital data is corrected. Correction of the digital data may be performed if the digital data contains some errors or problems. For example, if the digital data of a document was generated by a scanner by scanning a hard copy of a document, but the hard copy was fed to the scanner improperly, then, to improve a quality of the digital data, the image skew may be corrected, or data noise may be reduced. Once the correction of the digital data is completed, the corrected digital data may be stored in a storage device or in a cloud system, and a reference to the corrected digital data may be stored in a data object 3000 of FIG. 3.

In step 2040, image characteristics of the digital data are determined and matched with characteristics of known categories. Determining the image characteristics may be performed by processing corrected image data to extract parameters that are independent of a scale of the digital data. Those parameters may be used to characterize the image and to determine one or more categories for the digital data.

Matching the image characteristics of the digital data to the image characteristics of known categories may be performed by retrieving data structures that store information about the known categories. An example of such data structures is depicted in FIG. 8, above.

Referring again to FIG. 2A, in step 2060, the one or more categories identified in step 2050 and stored along with the corresponding confidence levels.

Associating a category with received digital data may be performed in many ways. For example, the association may be made by copying some of the information stored in a category data object 8000, depicted in FIG. 8, into an information data object 3000, depicted in FIG. 3. In particular, if an information data object 3000 has been created for the received digital data, and a main category 8010 of the category data object 8000 was found for the received digital data, then the reference to field 8010 may be copied to the linked list of field 3050 of the information data object 3000. Upon associating the category with the received digital data, the information data object 3000 for the digital data may be stored in a storage device or in a cloud system.

In step 2070, an optical character recognition of the digital data is performed. The OCR may be performed using an OCR processor 1050, depicted in FIG. 1A, or any other device configured to perform OCR. Performing OCR may involve converting image data to standard text format data and identifying word characteristics of the standard text format data. Then, the word characteristics may be sent to an IPC processor 1050 to identify categories for the digital data.

In step 2080, a determination is made whether one or more categories may be determined for the standard text format data. The determination may be made by finding a match between the word characteristics of the standard text format data and word characteristics of known categories. If a match is found, then the process proceeds to step 2090; otherwise the process proceeds to step 2100. An example of determining a category based on the word characteristics of the digital data is depicted in FIG. 10.

Figure 10:
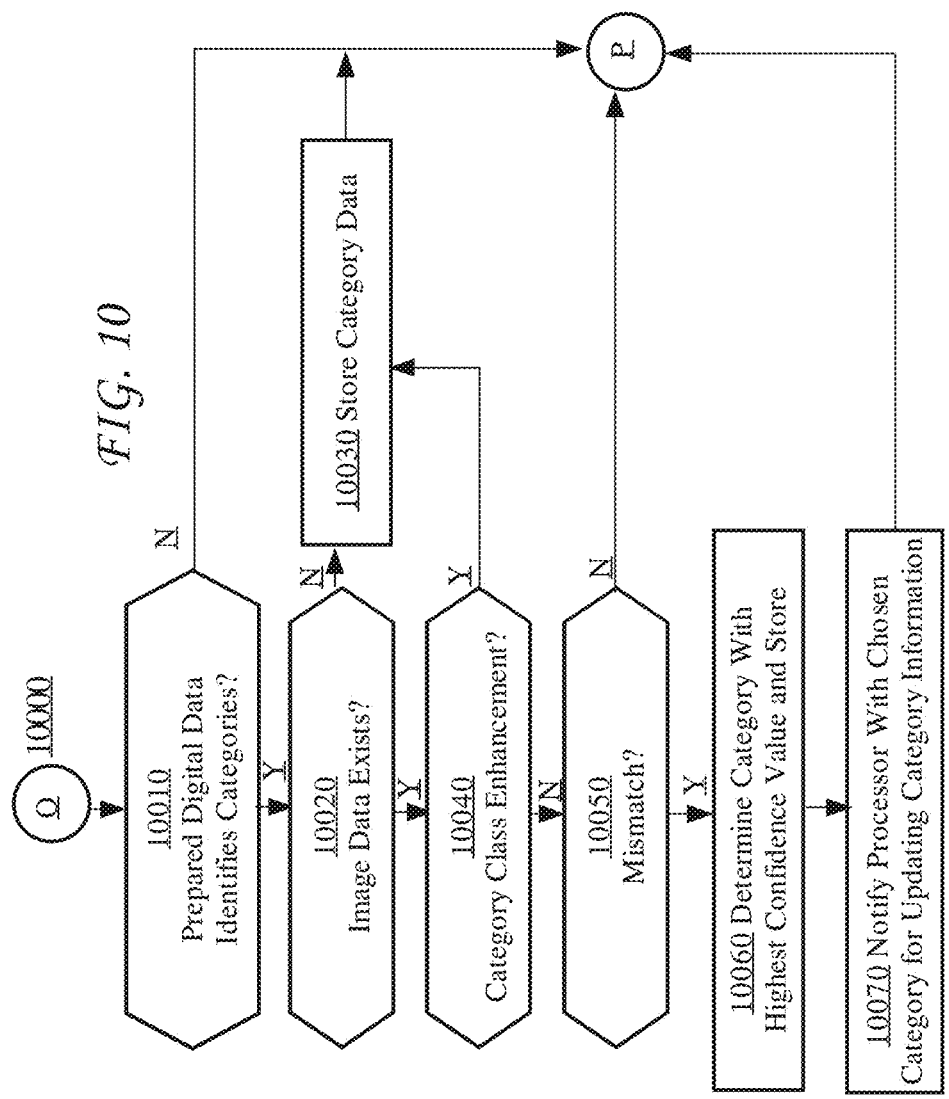
FIG. 10 is a flow diagram that depicts an example of determining one or more categories for standard text format data.

FIG. 10 is a flow diagram that depicts an example of determining one or more categories for standard text format data. In step 10010, a determination is made whether one or more categories may be identified from the standard text format data.

If at least one category is identified in step 10010, then a determination is made whether the image data is available.

If the image data is unavailable, then in step 10030, the identified category (or categories) is stored in an information data object created for the digital data.

However, if the image data is available, then in step 10040, a determination is made whether the identified category is an "enhancement," such as a new category or a sub-category. If the identified category is an enhancement, then in step 10030, the identified "enhancement" category (or categories) is stored in the information data object created for the digital data.

However, if the identified category is not an enhancement, then in step 10050, a determination is made whether there is a mismatch between the identified category and the categories previously identified for the digital data. If there is a mismatch, then in step 10060, the category with a higher confidence level is saved in data object created for the digital data, or used to replace the category with a lower confidence level in the data object. Furthermore, in step 10070, a notification is sent to an IPC processor to indicate that a category mismatch was encountered, and to request an update of the categorization process. In response to receiving the notification, a decision process log may be traced, the wrong decision node may be identified, and the decision process may be corrected so that a correct decision may be reached in the future.

However, if there is no mismatch, then the process of determining one or more categories for standard text format data ends.

Referring again to FIG. 2A, in step 2100, a determination is made whether, based on one or more categories identified for the received digital data, one or more applications configured to process the received digital data may be identified. For example, if a category "billing" has been identified for the received digital data, and one or more references to applications are stored in a "billing" category data object, then in step 2110, the one or more references to the application may be associated with the digital data created for the digital data. Otherwise, the process proceeds to step 2120.

Associating an application reference with received digital data may be performed in many ways. For example, the association may be made by copying some of the information stored in a category data object 8000, depicted in FIG. 8, to an information data object 3000, depicted in FIG. 3. In particular, if an information data object 3000 has been created for the received digital data, and a main category 8010 of the category data object 8000 was found as corresponding to the received digital data, then the application reference, stored in the reference field 8050, may be copied to the linked list of an application reference field 3040 of the information data object 3000. Upon associating the application reference with the received digital data, the information data object 3000 for the digital data may be stored in a storage device or in a cloud system.

In some situations, determining categories for digital data is difficult even if standard text format data for the digital data is available. In such a case, the standard text format data may be processed by semantic analysis processor 1060 of FIG. 1A, to generate semantic characteristics of the standard text format data. For example, semantic analysis processor 1060 may perform a semantics analysis of the standard text format data and determine one or more semantically coherent meanings of the digital data. The semantic characteristics of the digital data may be compared with the semantics characteristics of known categories, and if a match is found, then the matching categories may be associated with the digital data.

Referring again to FIG. 2A, in step 2120 a determination is made whether a semantic analysis of the digital data may be performed. A semantic analysis may not be performed if for example, a semantic analysis processor 1060 is unavailable, or the processing environment is not designed to support a semantic analysis processor, or the semantic analysis has been already performed. In such situations, the process proceeds to step 2140 of FIG. 2B. However, if a semantic analysis of the digital data may be performed, then the process proceeds to step 2130.

In step 2130, a semantic analysis of the digital data is performed to identify semantic characteristics of the digital data. Various examples of semantic analysis of the digital data have been provided above. The semantic characteristics of the digital data may be stored in an information data object, such as an information data object 3000 depicted in FIG. 3.

In step 2132, a determination is made whether the semantic characteristics of the digital data match any of the semantic characteristics of known categories. For example, if one of the semantic characteristics of the digital data is called an "insurance claim," and one of the semantic characteristics of a known category is also called an "insurance claim," then a match between the semantic characteristics of the digital data and the semantic characteristics of the known category is found. If the match is found, then the process proceeds to step 2134; otherwise the process proceeds to step 2140 of FIG. 2B.

In step 2134, category information maintained for the digital data is updated. The updating may be performed in the same fashion as it was performed in step 2090, described above.

In FIG. 2B, in step 2140, a determination is made whether one or more applications configured to process the received digital data may be identified based on one or more categories determined based on the semantic characteristics. If the one or more applications may be determined, then the process proceeds to step 2150; otherwise, the process proceeds to step 2160.

In step 2150, an application reference is associated with the received digital data. Associating an application reference with received digital data may be performed in many ways, including as it was described in step 2110 of FIG. 2A.

Referring again to FIG. 2B, once one or more application references are associated with the received digital data, an IPC processor may be invoked to initiate execution of the one or more applications. For example, if a reference of the application to be used to process insurance claims has been associated with the received digital data, then the IPC processor may initiate execution of the referenced application and processing of the insurance claims may start.

In step 2160, a determination is made whether any input from users may be helpful to correct category mismatches or other errors. For example, if after performing the image characteristics analysis, word characteristics analysis and semantic characteristics analysis for particular digital data, no category has been identified for the digital data, or no category has been identified with a certain level of confidence, then correcting information stored for the known categories or adding new categories may be recommended.

If any correction may be performed, then the process proceeds to step 2170, in which various modifications are performed. Examples of various modifications are depicted in FIG. 11.

C. Process Modifications

Figure 11:
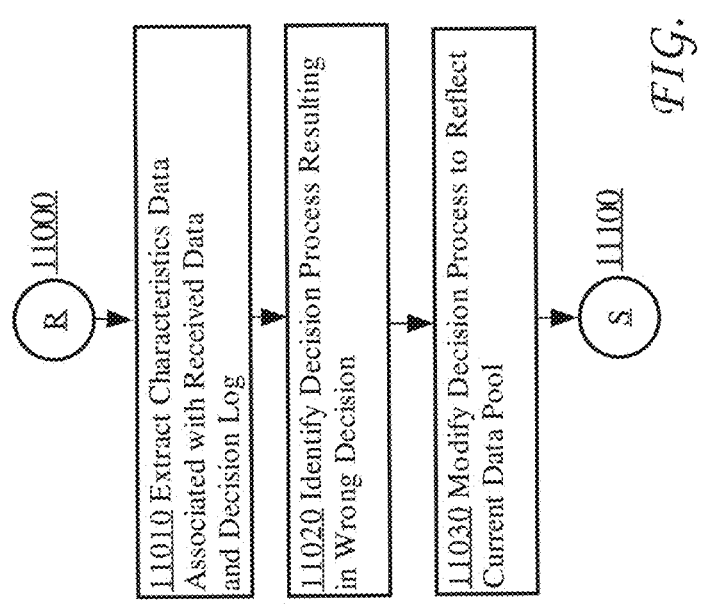
FIG. 11 is a flow diagram that depicts an example of process modifications.

FIG. 11 is a flow diagram that depicts an example of process modifications. Modifications to a data categorization process may be performed for a variety of reasons. For example, in some situations, even if all processes described in FIG. 1C are performed for the received digital data, no category can be determined for the data, or no category can be determined for the data with a certain level of confidence.

In step 11010, characteristics data associated with the received digital data and a decision log are extracted. Depending on their availability, the characteristics data may include image characteristics, word characteristics or semantic characteristics collected or obtained for the received digital data. A decision log may include a decision tree used to determine a category for the digital data.

In step 11020, based on the decision log, one or more decision processes that led to reaching a wrong decision are identified. For example, if the category or application references have been incorrectly assigned to the digital data, then the decision processes that led to the mismatch are identified.

In step 11030, the decision processes that led to reaching a wrong decision are modified. For example, if categories have been incorrectly assigned to the digital data, then the category assignment may be changed or modified to correct the wrong decision. The decision logic and process may be modified so that a correct decision may be made. According to another example, if application references have been incorrectly assigned to the digital data, then the reference assignments may be modified to correct the wrong assignments.

Furthermore, new categories and subcategories may be added, or classifications of subcategories for a given category may be modified. Moreover, image characteristics, word characteristics and semantic characteristics in the category data objects may be modified to support decision logic. Also, references to applications in the category data objects may be modified.

The modification may be performed manually or automatically. Also, the process of modifying the categorization process may be repeated multiple times or upon request.

D. Example of Processing Invoice Data Received from a Data Source

Figure 12:
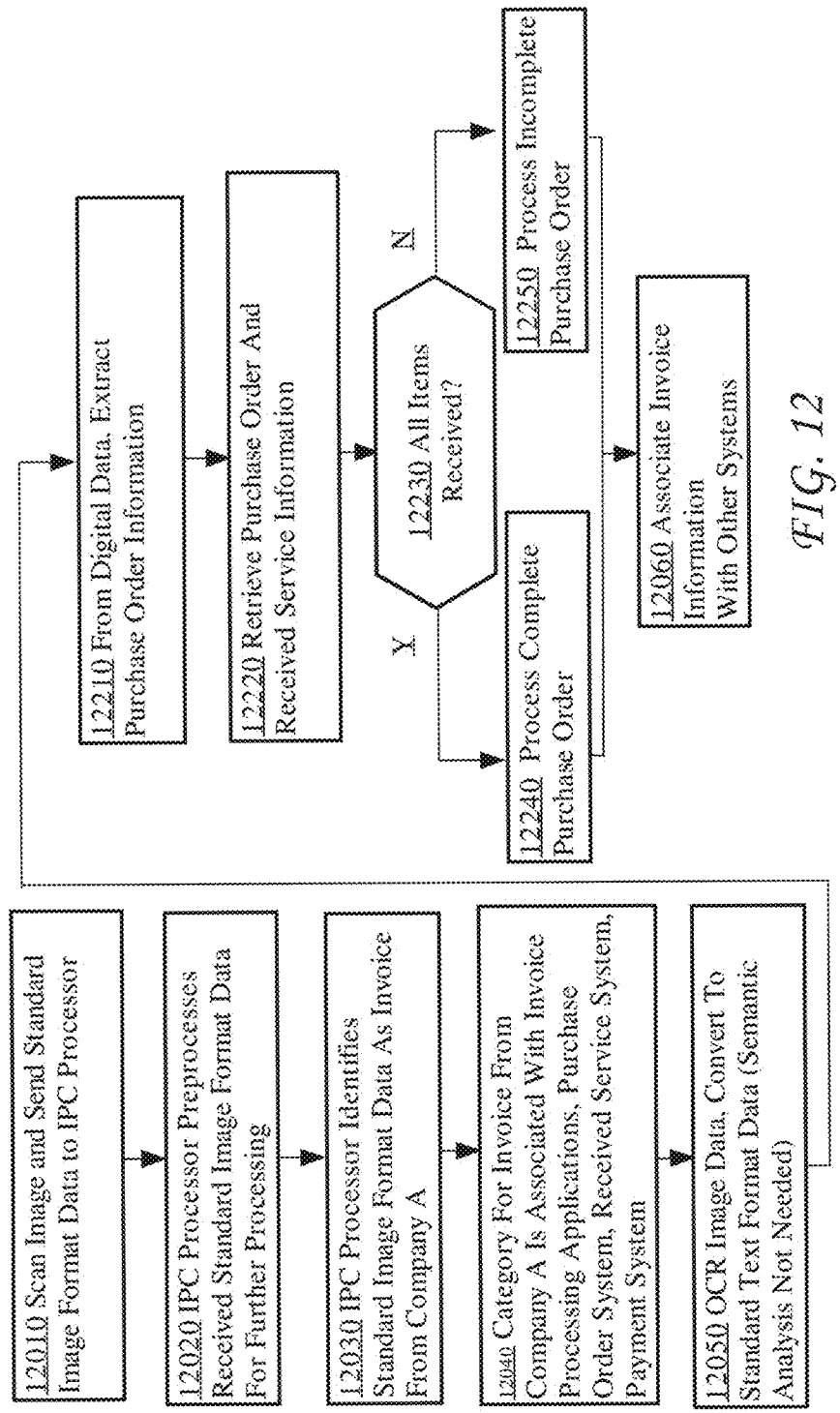
FIG. 12 is a flow diagram that depicts an example of processing invoice data received from a data source.

FIG. 12 is a flow diagram that depicts an example of processing invoice data received from a data source. In step 12010, a paper invoice was received from "Company A." The paper invoice was subsequently scanned to generate standard image format data, and the standard image format data of the scanned invoice was stored in a storage device for further preprocessing.

In step 12020, an IPC processor receives the standard image format data and preprocesses it for further processing. The preprocessing may include for example, removing data noise and correcting skew of the image.

In step 12030, an IPC processor identifies the standard image format data as an invoice from "Company A."

In step 12040, a category is determined for the standard image format data, and a determination is made that the category for the invoice from Company A is associated with one or more invoice processing applications, a purchase order system, a received service system and a payment system.

In step 12050, OCR on the standard image format data of the corrected data is performed to produce standard text format data.

In step 12210, purchase order information is extracted from the standard text format data.

In step 12220, the extracted purchase order information is used to retrieve a purchase order and received service information.

In step 12230, a determination is made whether all items for the purchaser order have been received. If all items have been received, then in step 12240, the complete purchase order is processed. However, if some items are missing, then in step 12250, the incomplete purchase order is processed. Processing of the incomplete purchase order may include sending a notice to a vendor to indicate that the order is incomplete and that the payment will be delayed until all items are provided. In some cases, depending upon the company's policy, the partial payment may be processed.

In step 12260, other applications are invoked to further process the results obtained or extracted in the previous steps. For example, if the partial payment is to be processed, then the database storing the purchase order and the payment history may be updated.

E. Category Editor

In an embodiment, an initial set of categories may be entered using a category editor. The category editor may also be used to edit the already entered categories, add new categories and subcategories, and delete or rename some categories and subcategories. An example of a category editor is depicted in FIG. 6.

Figure 6:
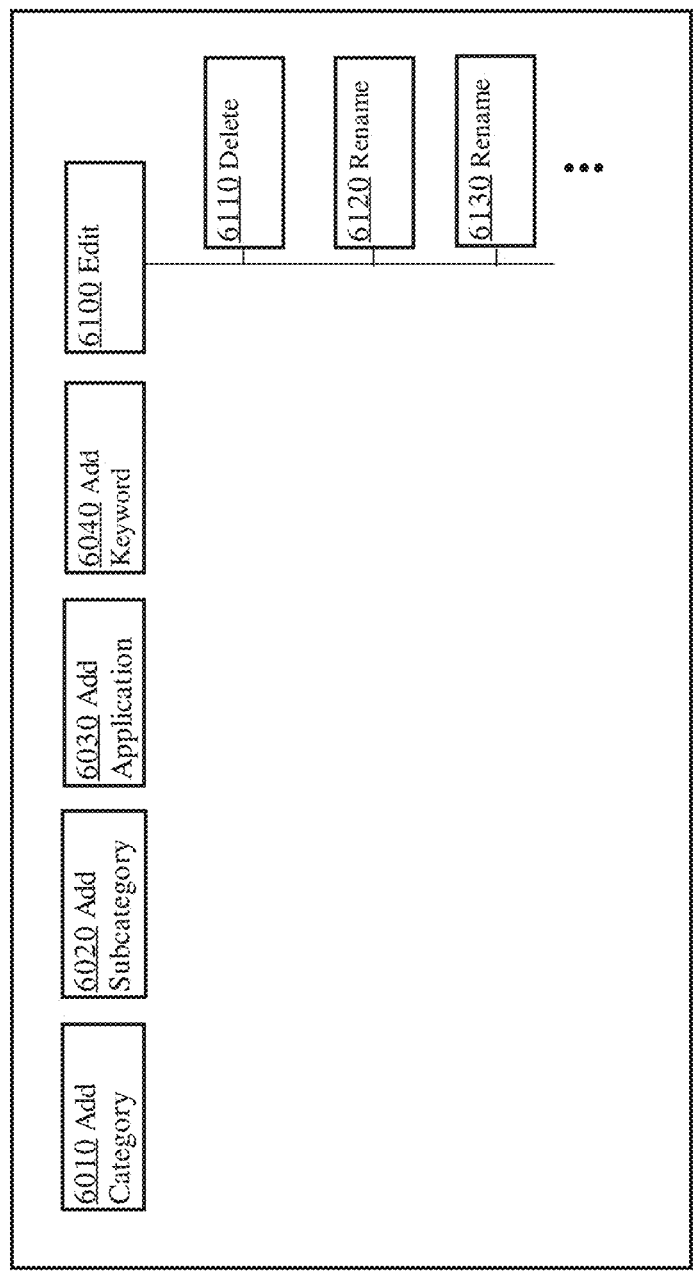
FIG. 6 is a block diagram that depicts an example category editor.

FIG. 6 depicts a user interface of an example category editor. The example depicts a simplified graphical user interface (GUI) of the category editor. Depending on the implementation, the design of GUI may vary. In the depicted example, the standard menu options such as a "File" option with a drop down menu containing sub-options such as "Open," "Save," "Save As," and so forth are omitted.

The depicted GUI comprises several buttons, such as an add category button 6010, an add subcategory button 6020, an add application button 6030, an add keyword button 6040, and an edit drop-down menu 6100. Add category button 6010 may be used to add a new category to a set of categories. Add subcategory button 6020 may be used to add a new subcategory for an existing category. Add application button 6030 may be used to add an application reference to a category data object defined for an existing category. Add application button 6030 has a drop-down menu for associating applications with the existing category and to disassociating applications from the existing category. Add keyword button 6040 may be used to add word characteristics. Edit pull-down menu 6100 may be used to edit the names of the categories, the names of the subcategories and the application references. For example, upon selecting the edit pull-down menu 6100, additional buttons may be displayed. The additional buttons may include a delete category button 6110, a rename button 6120, a rename button 6130, and other buttons not depicted in FIG. 6.

F. Training Process

Training process for generating an initial set of categories and subcategories may be performed using a sample of training data. In some implementations, the training process may be performed using a large sample of training data. The training process may involve receiving a large sample of training data, determining word characteristics and semantic characteristics of the training data and storing the characteristics in data structures. For example, the training data may be first ported to an input point B 2010, depicted in FIG. 2A, word characteristics and semantic characteristics of the training data may be automatically extracted or determined, and the characteristics may be stored in data structures such as an information object 3000, depicted in FIG. 3.

Figure 7:
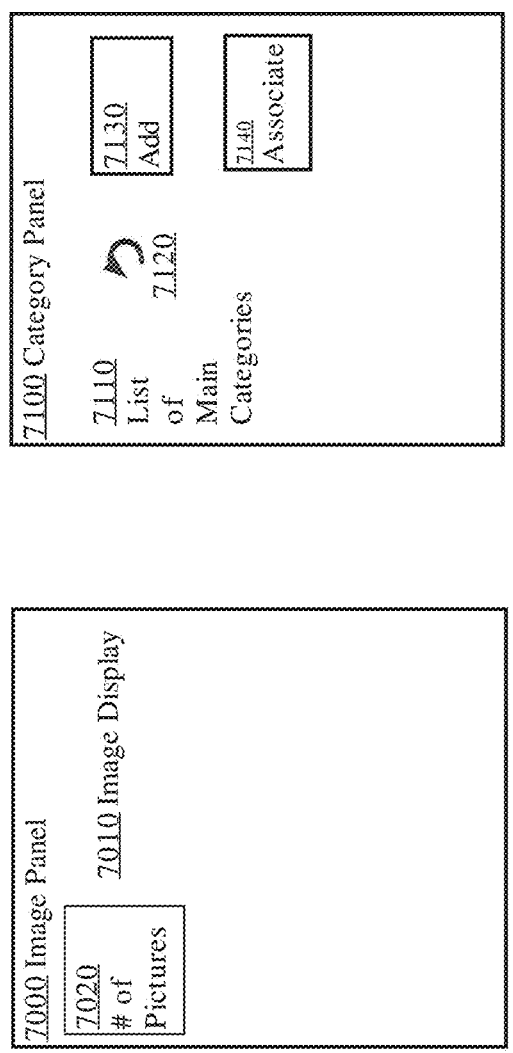
FIG. 7 is a block diagram that depicts a category training process.

FIG. 7 is a block diagram that depicts a category training process. The example depicts a simplified GUI of the category editor for associating images with categories. Depending on the implementation, the designs of GUI may vary. In the depicted example, the standard menu options such as a "File" option with a drop down menu containing sub-options such as "Open," "Save," "Save As," and so forth are omitted.

The depicted GUI comprises two panels: an image panel 7000 and a category panel 7100. In the image panel 7000, a subpanel 7020 may be displayed. The subpanel 7020 may be used to display the number of images to be shown in image display 7010.

A category panel 7100 may have several buttons, including a list of main category button 7110, a return button 7120, an add button 7130 and an associate button 7140. A list of main category button 7110 is a drop-down menu, which, once selected, causes generating a list of already known main categories and displaying the list in the category panel. If a category has subcategories, then a '+' sign may be displayed to the left of the main category. When a user selects the main category, the sub-categories may be displayed. When the user selects a button 7120, the display returns to the previous display. An associate button 7140 allows associating the image with the selected main category or with the selected subcategory. An add button 7130 is used to associate more than one categories with the image.

A training process for the categories may start from opening an image data file using a "File Open" option from the GUI's menu. Upon selecting the "File Open" option, a list of images represented in a standard image format may be displayed. The list of images may be generated off-line by scanning for example, invoice samples received from various companies and storing the scanned data as standard image format data.

Upon selecting a name of a particular image set, several images may be displayed in a panel 7010. The quantity of the displayed images is indicated in an indicator 7020. From the image display of the particular image, a user who trains the system may collect certain characteristics of the particular image, and use those characteristics to determine whether any of the categories listed in a drop-down list of categories in 7110 may be associated with the particular image. The user may scroll down through the list of the categories 7110, and upon selecting a particular category from the list, the name of the category (and additional information about the category) may be highlighted.

Once the user finds (or defines) a particular category that is suitable for a particular image, the user may associate the particular category with the particular image by selecting an "associate" button 7140. The association may be saved in an information data object created for the particular image.

The user may also create additional associations using an add button 7130.

The association may be edited by selecting an edit button of the main menu, not shown in FIG. 7.

The presented approach for processing and categorizing data received from various data sources overcomes the obstacles identified in the background section, above. For example, the presented approach allows processing and categorizing the received data regardless of the data type, format, source, purpose or readability.

The approach allows streamlining the processing of the data provided by a variety of heterogenic data sources, and overcomes the incompatibilities problems with which the companies need to deal nowadays.

Furthermore, the approach allows matching various processing applications with various incoming documents regardless of the type of the data source that provided the incoming documents. The approach may be easily modified to include new types of the received data, new processing applications, new categories and subcategories of the received data and new processing steps.

VI. Implementation Mechanisms

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 13:
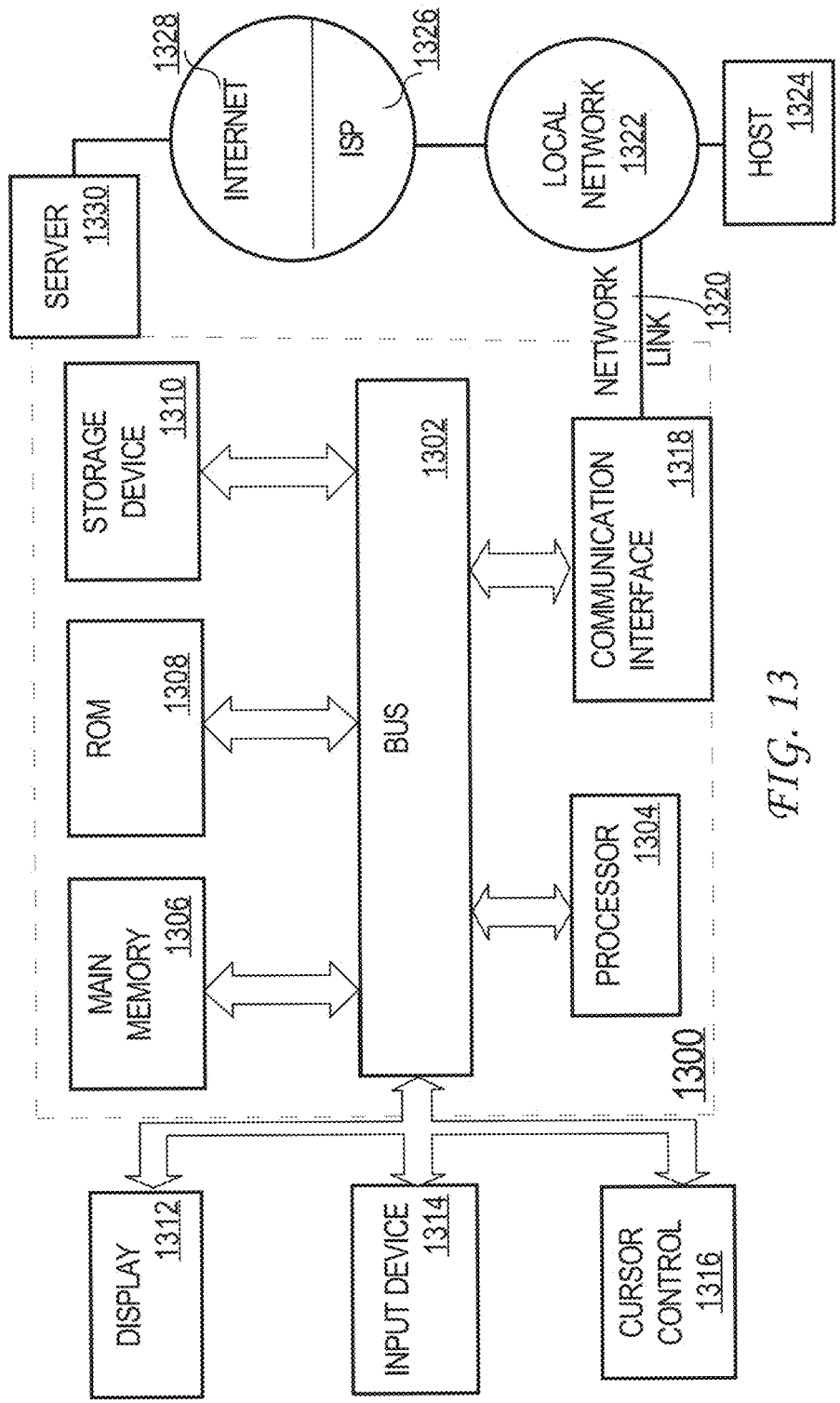
FIG. 13 is a block diagram that depicts an example computer system upon which embodiments may be implemented.

For example, FIG. 13 is a block diagram that illustrates a computer system 1300 upon which an embodiment of the invention may be implemented. Computer system 1300 includes a bus 1302 or other communication mechanism for communicating information, and a hardware processor 1304 coupled with bus 1302 for processing information. Hardware processor 1304 may be, for example, a general purpose microprocessor.

Computer system 1300 also includes a main memory 1306, such as a random access memory (RAM) or other dynamic storage device, coupled to bus 1302 for storing information and instructions to be executed by processor 1304. Main memory 1306 also may be used for storing temporary variables or other intermediate information during execution of instructions to be executed by processor 1304. Such instructions, when stored in non-transitory storage media accessible to processor 1304, render computer system 1300 into a special-purpose machine that is customized to perform the operations specified in the instructions.

Computer system 1300 further includes a read only memory (ROM) 1308 or other static storage device coupled to bus 1302 for storing static information and instructions for processor 1304. A storage device 1310, such as a magnetic disk or optical disk, is provided and coupled to bus 1302 for storing information and instructions.

Computer system 1300 may be coupled via bus 1302 to a display 1312, such as a cathode ray tube (CRT), for displaying information to a computer user. An input device 1314, including alphanumeric and other keys, is coupled to bus 1302 for communicating information and command selections to processor 1304. Another type of user input device is cursor control 1316, such as a mouse, a trackball, or cursor direction keys for communicating direction information and command selections to processor 1304 and for controlling cursor movement on display 1312. This input device typically has two degrees of freedom in two axes, a first axis (e.g., x) and a second axis (e.g., y), that allows the device to specify positions in a plane.

Computer system 1300 may implement the techniques described herein using customized hard-wired logic, one or more ASICs or FPGAs, firmware and/or program logic which in combination with the computer system causes or programs computer system 1300 to be a special-purpose machine. According to one embodiment, the techniques herein are performed by computer system 1300 in response to processor 1304 executing one or more sequences of one or more instructions contained in main memory 1306. Such instructions may be read into main memory 1306 from another storage medium, such as storage device 1310. Execution of the sequences of instructions contained in main memory 1306 causes processor 1304 to perform the process steps described herein. In alternative embodiments, hardwired circuitry may be used in place of or in combination with software instructions to implement embodiments described herein. Thus, embodiments are not limited to any specific combination of hardware circuitry and software.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 1310. Volatile media includes dynamic memory, such as main memory 1306. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1302. Transmission media can also take the form of acoustic or light waves, such as those generated during radio-wave and infra-red data communications.

Various forms of media may be involved in carrying one or more sequences of one or more instructions to processor 1304 for execution. For example, the instructions may initially be carried on a magnetic disk or solid state drive of a remote computer. The remote computer can load the instructions into its dynamic memory and send the instructions over a telephone line using a modem. A modem local to computer system 1300 can receive the data on the telephone line and use an infra-red transmitter to convert the data to an infra-red signal. An infra-red detector can receive the data carried in the infra-red signal and appropriate circuitry can place the data on bus 1302. Bus 1302 carries the data to main memory 1306, from which processor 1304 retrieves and executes the instructions. The instructions received by main memory 1306 may optionally be stored on storage device 1310 either before or after execution by processor 1304.

Computer system 1300 also includes a communication interface 1318 coupled to bus 1302. Communication interface 1318 provides a two-way data communication coupling to a network link 1320 that is connected to a local network 1322. For example, communication interface 1318 may be G4 LTE card, cable modem, satellite modem, or a modem to provide a data communication connection to a corresponding type of telephone line. As another example, communication interface 1318 may be a local area network (LAN) card to provide a data communication connection to a compatible LAN. Wireless links may also be implemented. In any such implementation, communication interface 1318 sends and receives electrical, electromagnetic or optical signals that carry digital data streams representing various types of information.

Network link 1320 typically provides data communication through one or more networks to other data devices. For example, network link 1320 may provide a connection through local network 1322 to a host computer 1324 or to data equipment operated by an Internet Service Provider (ISP) 1326. ISP 1326 in turn provides data communication services through the world wide packet data communication network now commonly referred to as the "Internet" 1328. Local network 1322 and Internet 1328 both use electrical, electromagnetic or optical signals that carry digital data streams. The signals through the various networks and the signals on network link 1320 and through communication interface 1318, which carry the digital data to and from computer system 1300, are example forms of transmission media.

Computer system 1300 can send messages and receive data, including program code, through the network(s), network link 1320 and communication interface 1318. In the Internet example, a server 1330 might transmit a requested code for an application program through Internet 1328, ISP 1326, local network 1322 and communication interface 1318.

The received code may be executed by processor 1304 as it is received, and/or stored in storage device 1310, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. An apparatus comprising:
one or more processors;
memory storing one or more sequences of instructions which, when executed by the one or more processors, cause:
receiving digital data;
converting the digital data into text data and identifying a plurality of words in the text data;
determining, based on the plurality of words, one or more characteristics of the text data; and
in response to determining that a first match between the one or more characteristics of the text data and one or more characteristics of one or more categories is found:
determining, based at least in part on the one or more characteristics of one or more categories, one or more first applications that are to be used to process the text data; and
initiating the one or more first applications to process the text data.

2. The apparatus of claim 1, wherein the memory further stores additional instructions which, when executed by the one or more processors, cause:
determining, based on the plurality of words, one or more word characteristics of the text data; and
in response to determining that a second match between the one or more word characteristics of the text data and one or more word characteristics of one or more categories is found:
determining, based at least in part on the one or more word characteristics of one or more categories, one or more second applications that are to be used to process the text data; and
initiating the one or more second applications to process the text data.

3. The apparatus of claim 2, wherein the memory further stores additional instructions which, when executed by the one or more processors, cause:
determining, based on a semantic analysis of the text data, one or more semantic characteristics of the text data; and
in response to determining that a third match between the one or more semantic characteristics of the text data and one or more semantic characteristics of one or more categories is found:
determining, based at least in part on the one or more semantic characteristics of one or more categories, one or more third applications that are to be used to process the text data; and
initiating the one or more third applications to process the text data.

4. The apparatus of claim 3, wherein the memory further stores additional instructions which, when executed by the one or more processors, cause:
performing one or more modifications of any one of: the one or more characteristics of one or more categories, the one or more word characteristics of one or more categories, the one or more semantic characteristics of one or more categories, or one or more references to any one of: the one or more first applications, the one or more second applications, or the one or more third applications;
wherein the instructions that cause performing one or more modifications further comprise instructions which, when executed by the one or more processors, cause:
extracting additional characteristic data from an input and decision log;
identifying a decision process resulting in deriving an incorrect decision; and
modifying the decision process resulting in deriving the incorrect decision.

5. The apparatus of claim 4,
wherein the instructions that cause the processors to determine whether a first match between the one or more characteristics of the text data and one or more characteristics of one or more categories is found further comprise instructions which, when executed, cause: determining a first confidence level value indicating how well the one or more characteristics of the text data match the one or more characteristics of one or more categories;
wherein the instructions that cause the processors to determine whether a second match between the one or more word characteristics of the text data and one or more word characteristics of one or more categories is found further comprise instructions which, when executed, cause: determining a second confidence level value indicating how well the one or more word characteristics of the text data match the one or more word characteristics of one or more categories; and
wherein the instructions that cause the processors to determine whether a third match between the one or more semantic characteristics of the text data and one or more semantic characteristics of one or more categories is found further comprise instructions which, when executed, cause: determining a third confidence level value indicating how well the one or more semantic characteristics of the text data match the one or more semantic characteristics of one or more categories.

6. The apparatus of claim 1, wherein the memory further stores additional instructions which, when executed by the one or more processors, cause:
maintaining a category data object for each of one or more categories;
wherein the category data object is generated during a training phase and using one or more sets of training data;
wherein the category data object comprises one or more of: a main category identifier, one or more levels of one or more subcategories, one or more image characteristics, one or more word characteristics, one or more semantics characteristics, or one or more references to one or more applications; and
wherein a new category may be added to the one or more categories by defining a new category data object, comprising one or more of: a new main category identifier, one or more levels of one or more new subcategories, one or more new image characteristics, one or more new word characteristics, one or more new semantics characteristics, or one or more new references to the one or more applications.

7. The apparatus of claim 1, wherein the memory further stores additional instructions which, when executed by the one or more processors, cause:
creating and storing an information object for the digital data;
wherein the information object comprises one or more of: a digital reference to the digital data, a word characteristic reference to the word characteristics, a semantic analysis data reference to the semantic characteristics, an application reference to one or more applications, a category information reference to the one or more categories, or a confidence level reference indicating confidence levels determined for each of the one or more categories.

8. The apparatus of claim 1, wherein the memory further stores additional instructions which, when executed by the one or more processors, cause:
adding a new category using a category editor;
wherein the category editor displays a graphical user interface (GUI) for adding the new category.

9. A non-transitory computer-readable storage medium storing one or more sequences of instructions which, when executed by one or more processors, cause:
receiving digital data;
converting the digital data into text data and identifying a plurality of words in the text data;
determining, based on the plurality of words, one or more characteristics of the text data; and
in response to determining that a first match between the one or more characteristics of the text data and one or more characteristics of one or more categories is found:
determining, based at least in part on the one or more characteristics of one or more categories, one or more first applications that are to be used to process the text data; and
initiating the one or more first applications to process the text data.

10. The non-transitory computer-readable storage medium of claim 9, further storing additional instructions which, when executed by the one or more processors, cause:
determining, based on the plurality of words, one or more word characteristics of the text data; and
in response to determining that a second match between the one or more word characteristics of the text data and one or more word characteristics of one or more categories is found:
determining, based at least in part on the one or more word characteristics of one or more categories, one or more second applications that are to be used to process the text data; and
initiating the one or more second applications to process the text data.

11. The non-transitory computer-readable storage medium of claim 10, further storing additional instructions which, when executed by the one or more processors, cause:
determining, based on a semantic analysis of the text data, one or more semantic characteristics of the text data; and
in response to determining that a third match between the one or more semantic characteristics of the text data and one or more semantic characteristics of one or more categories is found:
determining, based at least in part on the one or more semantic characteristics of one or more categories, one or more third applications that are to be used to process the text data; and
initiating the one or more third applications to process the text data.

12. The non-transitory computer-readable storage medium of claim 11, further storing additional instructions which, when executed by the one or more processors, cause:
performing one or more modifications of any one of: the one or more characteristics of one or more categories, the one or more word characteristics of one or more categories, the one or more semantic characteristics of one or more categories, or one or more references to any one of: the one or more first applications, the one or more second applications, or the one or more third applications;
wherein the instructions that cause performing one or more modifications further comprise instructions which, when executed by the one or more processors, cause:
extracting additional characteristic data from an input and decision log;
identifying a decision process resulting in deriving an incorrect decision; and
modifying the decision process resulting in deriving the incorrect decision.

13. The non-transitory computer-readable storage medium of claim 12,
wherein the instructions that cause the processors to determine whether a first match between the one or more characteristics of the text data and one or more characteristics of one or more categories is found further comprise instructions which, when executed, cause: determining a first confidence level value indicating how well the one or more characteristics of the text data match the one or more characteristics of one or more categories;
wherein the instructions that cause the processors to determine whether a second match between the one or more word characteristics of the text data and one or more word characteristics of one or more categories is found further comprise instructions which, when executed, cause: determining a second confidence level value indicating how well the one or more word characteristics of the text data match the one or more word characteristics of one or more categories; and
wherein the instructions that cause the processors to determine whether a third match between the one or more semantic characteristics of the text data and one or more semantic characteristics of one or more categories is found further comprise instructions which, when executed, cause: determining a third confidence level value indicating how well the one or more semantic characteristics of the text data match the one or more semantic characteristics of one or more categories.

14. The non-transitory computer-readable storage medium of claim 9, further storing additional instructions which, when executed by the one or more processors, cause:
maintaining a category data object for each of one or more categories;
wherein the category data object is generated during a training phase and using one or more sets of training data;
wherein the category data object comprises one or more of: a main category identifier, one or more levels of one or more subcategories, one or more image characteristics, one or more word characteristics, one or more semantics characteristics, or one or more references to one or more applications; and
wherein a new category may be added to the one or more categories by defining a new category data object, comprising one or more of: a new main category identifier, one or more levels of one or more new subcategories, one or more new image characteristics, one or more new word characteristics, one or more new semantics characteristics, or one or more new references to the one or more applications.

15. The non-transitory computer-readable storage medium of claim 9, further storing additional instructions which, when executed by the one or more processors, cause:

creating and storing an information object for the digital data;

wherein the information object comprises one or more of: a digital reference to the digital data, a word characteristic reference to the word characteristics, a semantic analysis data reference to the semantic characteristics, an application reference to one or more applications, a category information reference to the one or more categories, or a confidence level reference indicating confidence levels determined for each of the one or more categories.

16. The non-transitory computer-readable storage medium of claim 9, further storing additional instructions which, when executed by the one or more processors, cause:

adding a new category using a category editor;

wherein the category editor displays a graphical user interface (GUI) for adding the new category.

17. A method comprising:

receiving digital data;

converting the digital data into text data and identifying a plurality of words in the text data;

determining, based on the plurality of words, one or more characteristics of the text data; and in response to determining that a first match between the one or more characteristics of the text data and one or more characteristics of one or more categories is found:

determining, based at least in part on the one or more characteristics of one or more categories, one or more first applications that are to be used to process the text data; and initiating the one or more first applications to process the text data.

18. The method of claim 17, further comprising:

determining, based on the plurality of words, one or more word characteristics of the text data; and in response to determining that a second match between the one or more word characteristics of the text data and one or more word characteristics of one or more categories is found:

determining, based at least in part on the one or more word characteristics of one or more categories, one or more second applications that are to be used to process the text data; and initiating the one or more second applications to process the text data.

19. The method of claim 18, further comprising:

determining, based on a semantic analysis of the text data, one or more semantic characteristics of the text data; and in response to determining that a third match between the one or more semantic characteristics of the text data and one or more semantic characteristics of one or more categories is found:

determining, based at least in part on the one or more semantic characteristics of one or more categories, one or more third applications that are to be used to process the text data; and initiating the one or more third applications to process the text data.

20. The method of claim 19, further comprising:

performing one or more modifications of any one of: the one or more characteristics of one or more categories, the one or more word characteristics of one or more categories, or the one or more semantic characteristics of one or more categories, or one or more references to any one of: the one or more first applications, the one or more second applications, or the one or more third applications;

wherein performing one or more modifications comprises:

extracting additional characteristic data from an input and decision log;

identifying a decision process resulting in deriving an incorrect decision; and modifying the decision process resulting in deriving the incorrect decision.

* * * * *